(12) United States Patent
Kim (10) Patent No.: US 12,392,402 B1
(45) Date of Patent: Aug. 19, 2025

(54) VEHICLE POWER TRANSMISSION ASSEMBLY AND ASSEMBLY METHOD THEREOF

(71) Applicants: HYUNDAI MOTOR COMPANY, Seoul (KR); KIA CORPORATION, Seoul (KR)

(72) Inventor: Seung-Won Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/908,343

(22) Filed: Oct. 7, 2024

(30) Foreign Application Priority Data

May 30, 2024 (KR) .................. 10-2024-0070720

(51) Int. Cl.
*F16H 48/42* (2012.01)
*F16D 1/06* (2006.01)
*F16H 57/12* (2006.01)
*F16H 48/38* (2012.01)

(52) U.S. Cl.
CPC .............. *F16H 48/42* (2013.01); *F16D 1/06* (2013.01); *F16H 57/12* (2013.01); *F16D 2300/12* (2013.01); *F16H 2048/382* (2013.01)

(58) Field of Classification Search
CPC ........ F16D 1/06; F16D 2300/12; F16H 57/12; F16H 48/38; F16H 2048/382
See application file for complete search history.

(56) References Cited

U.S. PATENT DOCUMENTS

| | | | | |
|---|---|---|---|---|
| 3,650,013 | A * | 3/1972 | Boers | B23P 19/04 |
| | | | | 29/259 |
| 9,115,796 | B1 * | 8/2015 | Yanase | F16H 57/029 |
| 2004/0162178 | A1 * | 8/2004 | Krzesicki | F16H 48/24 |
| | | | | 475/230 |
| 2013/0252776 | A1 * | 9/2013 | Nakao | F16H 48/40 |
| | | | | 475/220 |
| 2023/0035884 | A1 * | 2/2023 | Stadtfeld | F16H 1/2854 |

FOREIGN PATENT DOCUMENTS

JP 2007292121 A * 11/2007
KR 1998-0041937 B1 9/1998

* cited by examiner

*Primary Examiner* — Timothy Hannon
(74) *Attorney, Agent, or Firm* — MCDONNELL BOEHNEN HULBERT & BERGHOFF LLP (57) ABSTRACT

A vehicle power transmission assembly includes a differential side gear transmitting power from an engine to wheels on both sides, a drive shaft coupled to the differential side gear to transmit, to wheels, driving force transmitted by the differential side gear, and a nut fastened to an outer circumference of the drive shaft to engage with the differential side gear.

10 Claims, 11 Drawing Sheets

SIDE GEAR AND STEM
(TRAPEZOIDAL SHAPE)
ARE ENGAGED
WITH EACH OTHER

FIG. 14

VEHICLE POWER TRANSMISSION ASSEMBLY AND ASSEMBLY METHOD THEREOF

CROSS-REFERENCE TO RELATED APPLICATION

This application claims priority to Korean Patent Application No. 10-2024-0070720, filed on May 30, 2024 which is incorporated herein by reference in its entirety.

BACKGROUND OF THE DISCLOSURE

Field of the Disclosure

The present disclosure relates to a vehicle power transmission assembly and an assembly method thereof.

Description of Related Art

Backlash is a common problem in a power transmission structure in which gear components are connected. In the case of high-end passenger vehicles, longitudinal engines and rear-wheel drive types are often used, and clearances of gears between propeller shaft-differential-drive shaft at the front of the vehicle are highly susceptible to backlash. In particular, the connection between the drive shaft as a final stage and the differential has a clearance that occurs after the final reduction ratio of the differential, so even a small clearance causes a large volume of noise (because the differential also acts as a resonator).

Figure 1:
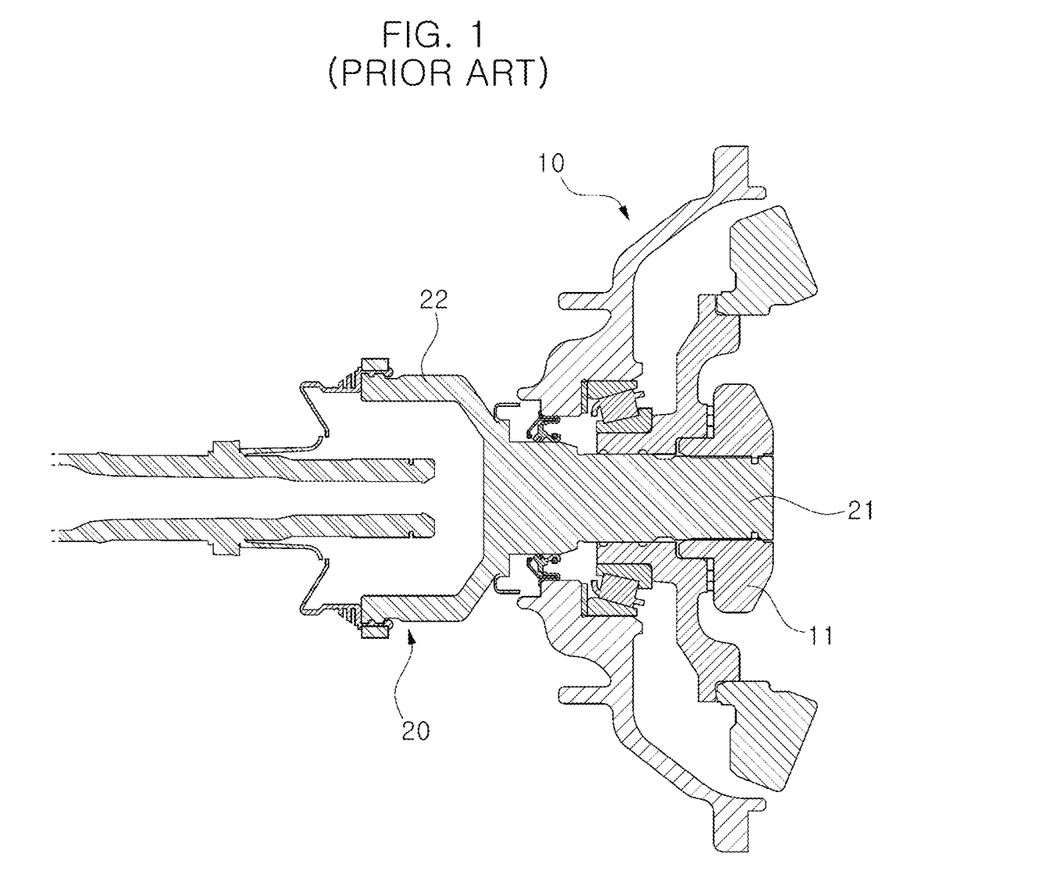
FIG. 1 is a diagram illustrating the assembly structure of a conventional power transmission assembly.
Figure 2:
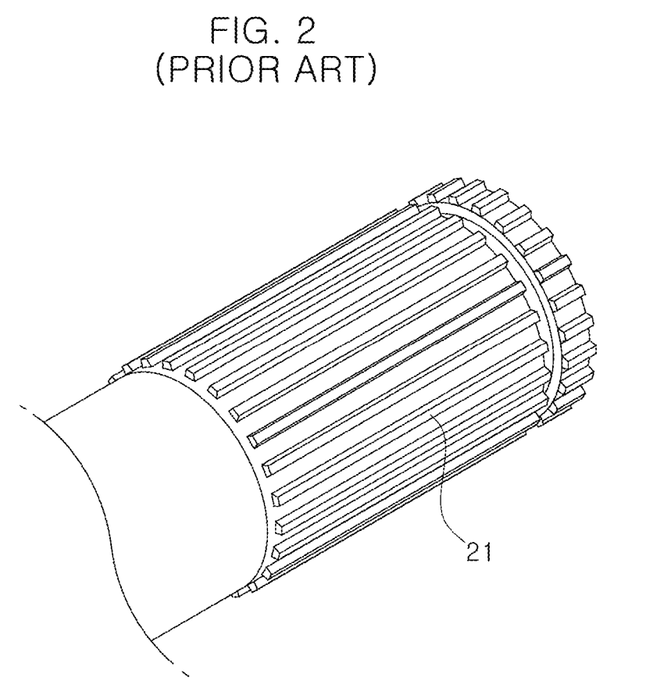
FIG. 2 is a diagram illustrating a portion of the assembly structure.

In other words, as illustrated in FIGS. 1 and 2, a stem 21 formed at the joint part of a drive shaft 20 is slidably coupled into a differential side gear 11 provided in the casing of a differential 10, but in the case of a stem-type coupling, backlash occurs frequently due to the existence of clearance between the stems. The smaller the clearance between the stems is, the poorer the assembly work and after-sales service are provided, so a clearance is necessary, and backlash occurs accordingly.

To improve this, the conventional stem coupling type was changed to the bolting type. In the case of the stem coupling type, a clearance is created between the gear teeth in consideration of assembly work and after-sales service, so the stem coupling type was changed to the bolting type (companion flange type), in which the stem part is press-indented without creating any clearance around the stem part. However, the bolting type is disadvantageous in packaging due to the increased size, and the increase in cost and weight is too large, so a great consideration is required to apply the bolting type to a vehicle, and there are many cases in which the bolting type cannot be applied.

The foregoing background description is intended to provide an understanding of the background of the disclosure, and may include matters that are not the related art technology already known to one of ordinary skill in the art to which this technology belongs.

SUMMARY OF THE DISCLOSURE

The present disclosure is intended to provide a vehicle power transmission assembly capable of solving both a problem caused by a clearance in a stem part, and the packaging and cost disadvantages of a bolting type, and an assembly method thereof.

An aspect of the present disclosure provides a vehicle power transmission assembly including a differential side gear transmitting power from an engine to wheels on both sides, a drive shaft coupled to the differential side gear to transmit, to wheels, driving force transmitted by the differential side gear, and a nut fastened to an outer circumference of the drive shaft to engage with the differential side gear.

A joint part of the drive shaft may be engaged through the differential side gear, and the nut may engage with a threaded tap formed on an end of the differential side gear.

The power transmission assembly may further include a spring coupled between the nut and a body part of the drive shaft to resiliently support the nut.

The power transmission assembly may further include a stopper inserted into a stopper groove formed on an outer circumferential surface of the drive shaft, wherein the stopper protrudes beyond the outer circumferential surface of the drive shaft.

The nut may be formed with a locking portion that protrudes radially inward to be caught by the stopper so that the nut is restricted in engagement position.

An end of the differential side gear may be caught by the stopper so that the differential side gear is restricted in engagement position.

A pair of stems may be provided on an outer surface of the joint part of the drive shaft and an inner surface of the differential side gear, respectively, so that the stems are slidably engaged with each other.

The stems provided on the outer surface of the drive shaft and the inner surface of the differential side gear, respectively, may have a trapezoidal cross-sectional shape in which the length direction corresponds to the height direction of the trapezoid.

Another aspect of the present disclosure provides a method of assembling a vehicle power transmission assembly, the method including slidably assembling, by an assembly device, a stem formed on an inner surface of a differential side gear transmitting power from an engine to wheels on both sides and a stem formed on an outer surface of a drive shaft transmitting, to wheels, driving force transmitted by the differential side gear; and fastening, a fastening device, a nut coupled to an outer circumference of the drive shaft to a threaded tap formed on an end of the differential side gear.

The stems provided on the outer surface of the drive shaft and the inner surface of the differential side gear, respectively, may have a trapezoidal cross-sectional shape in which the length direction corresponds to the height direction of the trapezoid.

The nut may be resiliently supported by a spring coupled between the nut and a body part of the drive shaft.

The nut may be restricted in engagement position by a stopper coupled to an outer circumferential surface of the drive shaft.

The bolting type connection in the power transmission structure is suitable as a backlash improvement solution for vehicles with unfavorable packaging and difficult to increase weight (cost), such as platforms dedicated to electric vehicles.

However, in the bolting type connection, the outer diameter of the outer ring is increased, which is disadvantageous in packaging, making it difficult to apply to electric vehicles, whereas the wedge structure is applicable because the size of the outer ring is the same.

In addition, performance in terms of cost and weight is equivalent or superior to the conventional configuration, which means that the system is advantageous due to equivalent performance, no weight increase, and the equivalent cost compared to the bolting type connection.

In addition, upon turning in the opposite direction, the nut of the shaft is decoupled from the side gear, and then freely removed in the transverse direction, which is advantageous in maintenance of the drive shaft, and shaft assembly may be performed in the opposite order by tightening the nut after fastening the stems.

DETAILED DESCRIPTION

In order to fully appreciate the purpose, operation, and operational advantages of the present disclosure, reference should be made to the accompanying drawings, which illustrate preferred embodiments of the present disclosure, and to the description thereof.

In describing preferred embodiments of the present disclosure, any description or repetition of the disclosure that would unnecessarily obscure the essence of the present disclosure is hereby reduced or omitted.

Figure 3:
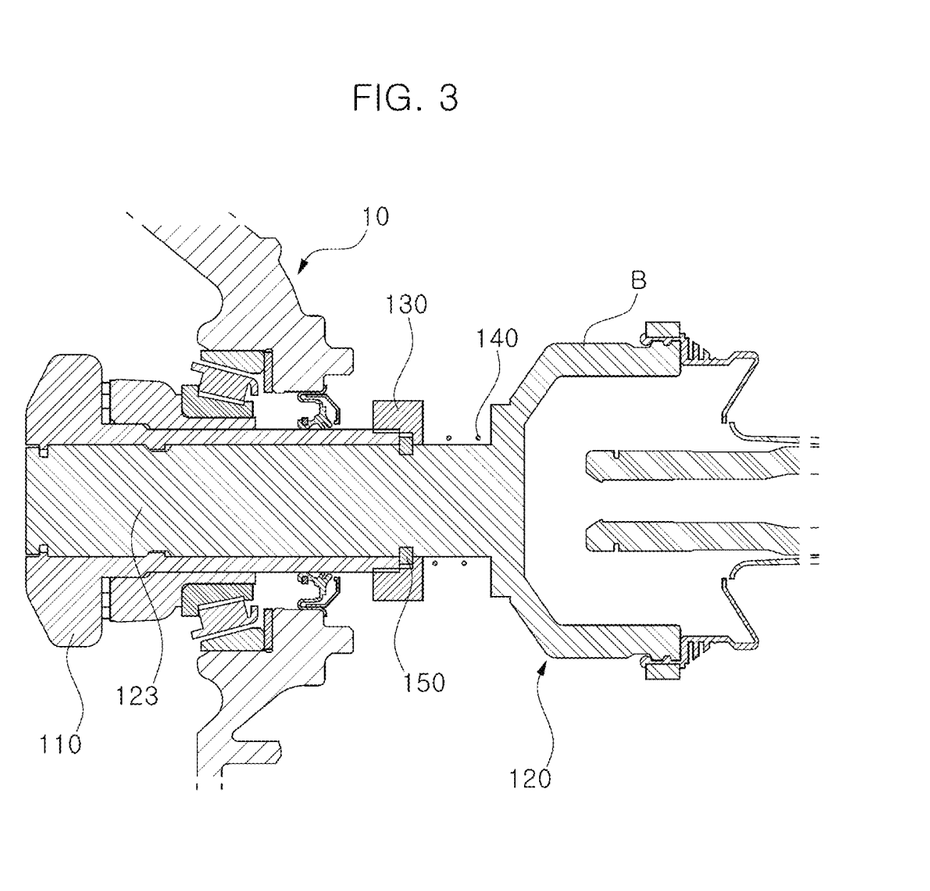
FIG. 3 is a cross-sectional diagram illustrating a power transmission assembly according to an embodiment of the present disclosure.
Figure 4:
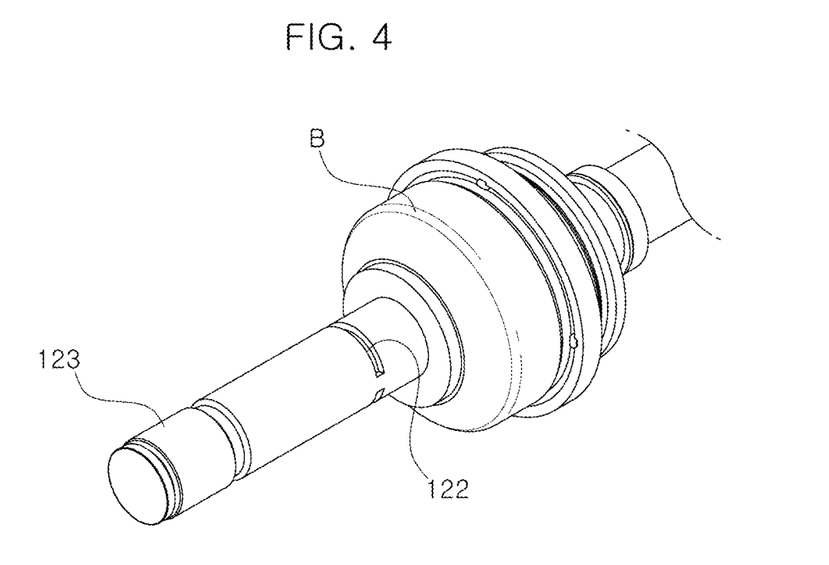
FIG. 4 is a diagram illustrating a drive shaft of the power transmission assembly according to an embodiment of the present disclosure.

FIG. 3 is a cross-sectional diagram illustrating a power transmission assembly according to an embodiment of the present disclosure, and FIG. 4 is a diagram illustrating a drive shaft of the power transmission assembly according to an embodiment of the present disclosure.

Hereinafter, with reference to FIGS. 3 and 4, a vehicle power transmission assembly and an assembly method thereof according to an embodiment of the present disclosure will be described.

The power transmission assembly of the present disclosure includes a differential 10 for transmitting power from an engine to both wheels, and a drive shaft 120 engaged with a differential side gear 110 in the casing of the differential 10 to transmit to each wheel driving force transmitted by the differential side gear 110.

The present disclosure is provided to overcome the problem of the conventional stem structure of the power transmission assembly and the limitation of the bolting type connection to solve the problem, and has the structure in which the differential side gear 110 and the drive shaft 120 are engaged with each other by using a nut 130 to apply a strong lateral pressure, which substantially eliminates the backlash as in the wheel side during the wheel-nut fastening process.

As illustrated, a joint part 123 of the drive shaft 120 has an outer diameter corresponding to an inner diameter of the differential side gear 110, so that the joint part is engaged with the differential side gear 110 therethrough.

Then, the nut 130 is screwed around an end of the differential side gear 110, into which the drive shaft 120 is inserted, and an outer circumference of the drive shaft 120 by threaded taps formed on the end and the outer circumference, respectively.

A spring 140 is provided between the nut 130 and a body part B of the drive shaft 120 to apply resilient force to cause the nut 130 to be engaged while exerting a force toward the differential side gear 110, which also prevents the nut from loosening.

Furthermore, for positioning of the nut 130, the drive shaft 120 is provided with a stopper groove 122 formed in the outer circumferential surface, a stopper 150 is inserted into the stopper groove 122 so as to protrude out from the outer circumferential surface of the drive shaft 120, and a locking portion is formed on the nut 130 so as to be engaged with the stopper 150.

On the other hand, a pair of stems is formed on an outer surface of the joint part 123 of the drive shaft 120 and an inner surface of the differential side gear 110, respectively, so that the stems are slidably assembled to each other.

Figure 5:
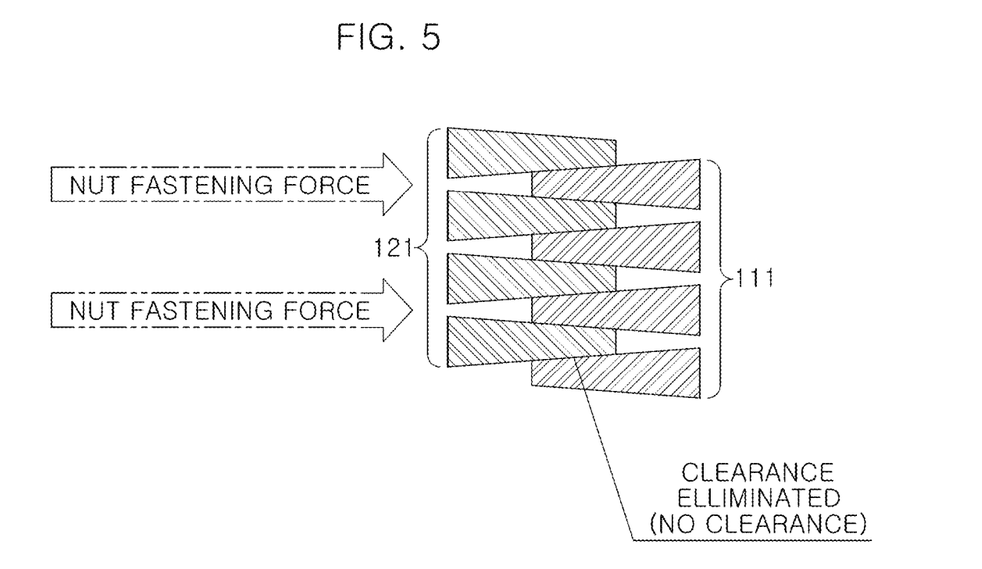
FIG. 5 is a schematic diagram illustrating the stem-to-stem engagement of the power transmission assembly according to an embodiment of the present disclosure.
Figure 6:
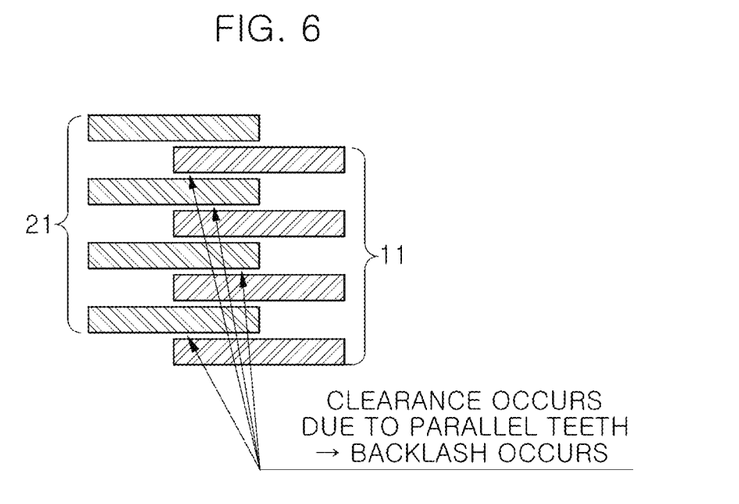
FIG. 6 is a diagram illustrating the conventional stem-to-stem engagement.

Further, as illustrated in FIG. 5, the stem 121 formed on the outer surface of the drive shaft 120 and the stem 111 formed on the inner surface of the differential side gear 110 have a trapezoidal cross-sectional shape in which the length direction corresponds to the height direction of the trapezoid. This makes it possible to eliminate the clearance, as illustrated.

On the other hand, as illustrated in FIG. 4, the conventional parallel stems have clearances between them due to their parallel teeth, which causes backlash, and the clearances become larger and larger due to assembly.

According to the present disclosure, the trapezoid-shaped stems and the lateral pressure caused by the nut tightening torque eliminate the clearances and eliminate the backlash.

Furthermore, compared to the conventional bolting type, the improved wedge type of the present disclosure may maintain the same diameter of the body part as in the conventional configuration, which is more advantageous in packaging as the wedge type does not require an increase in size.

For example, when applying the bolting type in an electric vehicle, although it is not applicable due to lack of clearance with a sub-frame, or the like, the improved wedge type mount of the present disclosure is applicable, since it does not require an increase in the diameter of the body part.

Hereinafter, an assembly method of the power transmission assembly described above will be described with reference to FIGS. 7 to 14.

Figure 7:
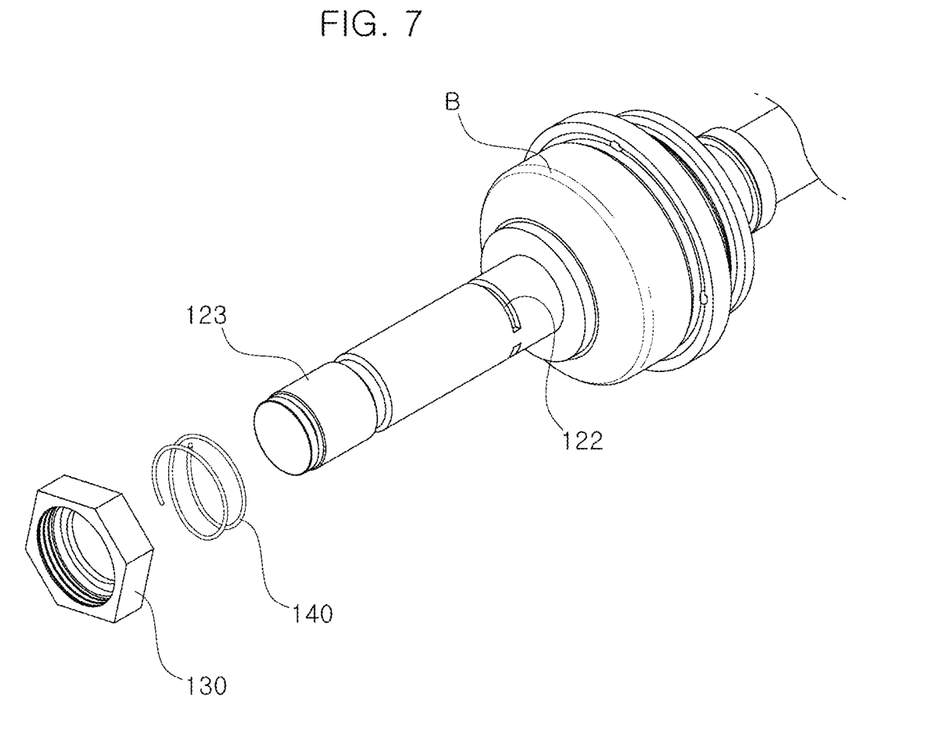
FIGS. 7, 8, 9, 10, 11, 12, 13, and 14 are diagrams sequentially illustrating an assembly procedure of the power transmission assembly according to an embodiment of the present disclosure.

A spring 140 and a nut 130 are fitted around the outer circumference of the joint part 123 of the drive shaft 120. The spring 140 is positioned between the nut 130 and the body part to provide a resilient support to the nut 130.

Figure 9:
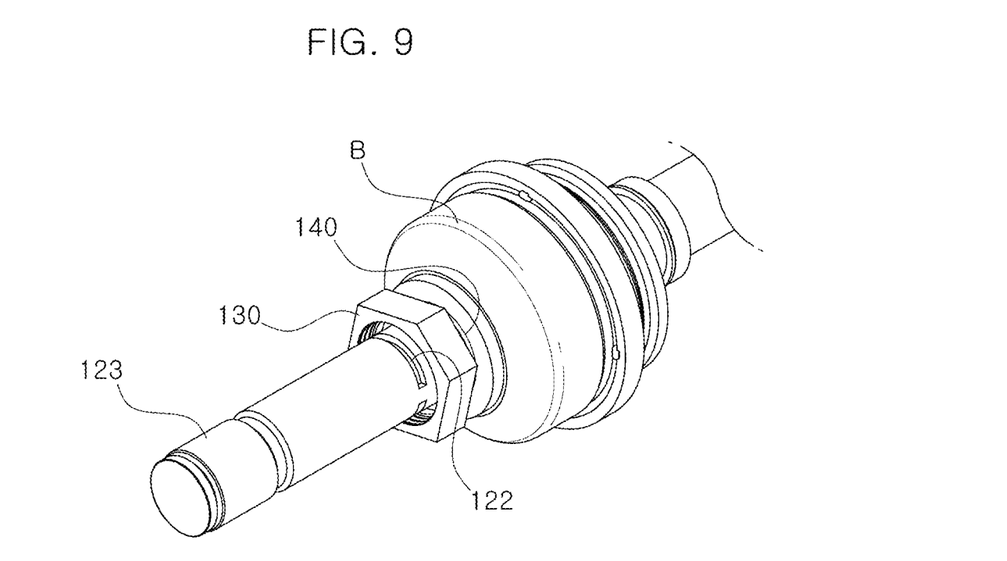

Then, the nut 130 is pushed as far as possible toward the body part and allows the spring 140 to force the nut as illustrated in FIG. 9.

Figure 8:
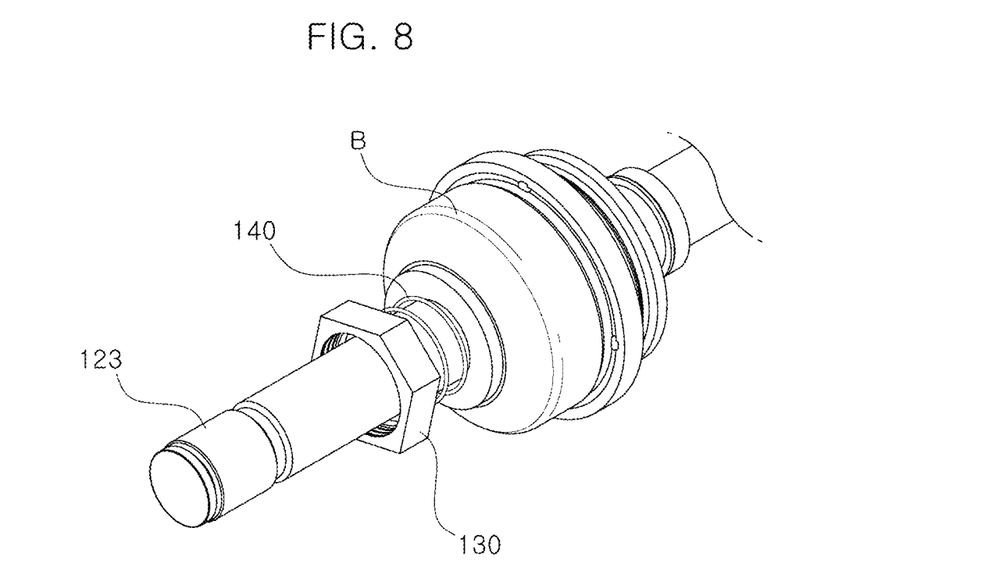
Figure 10:
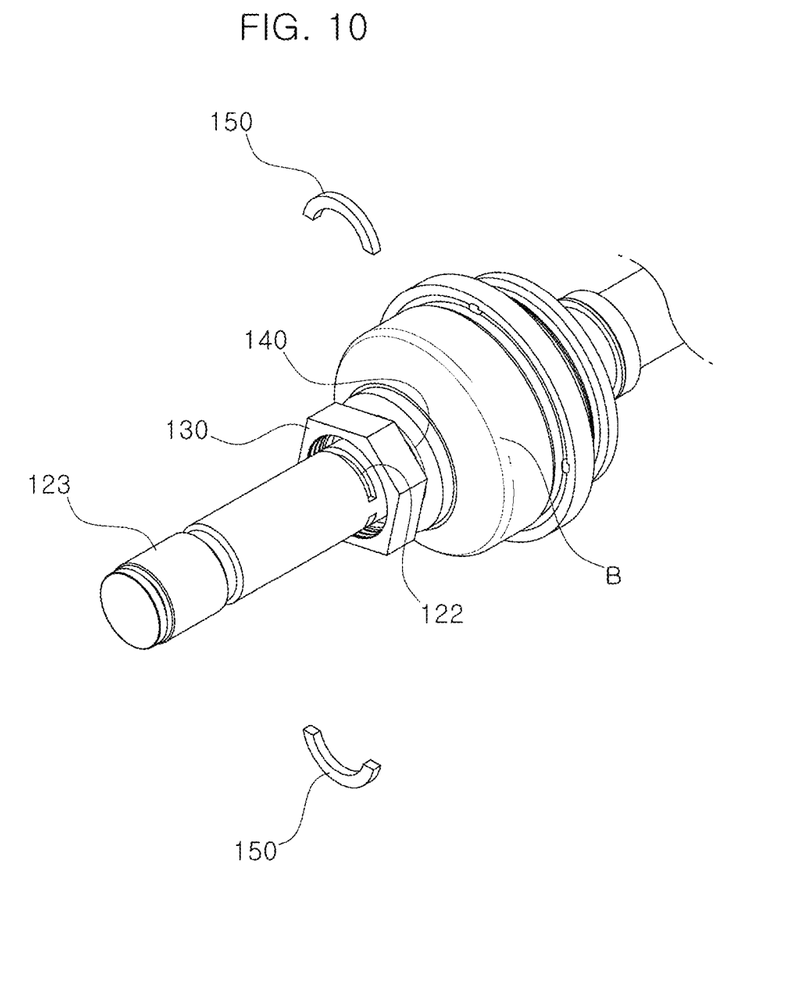
Figure 11:
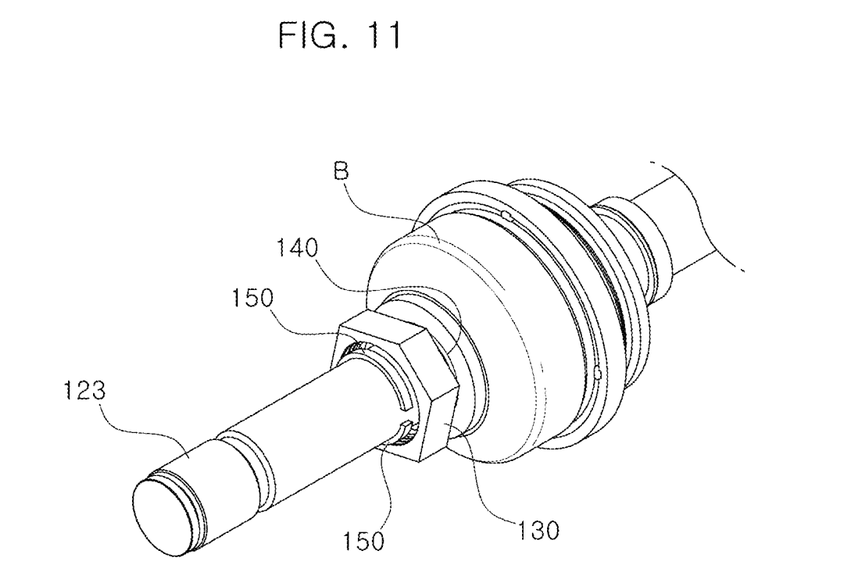

At this time, the stopper 150 is interference-fitted into the open stopper groove 122 as illustrated in FIGS. 10 and 11, providing an appearance illustrated in FIG. 8.

Figure 12:
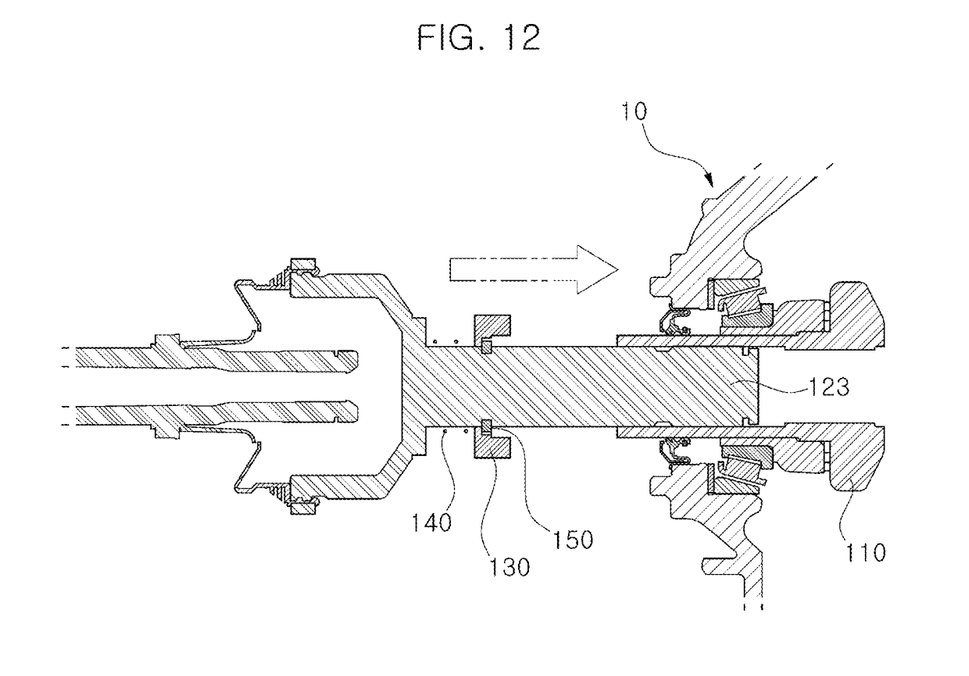
Figure 13:
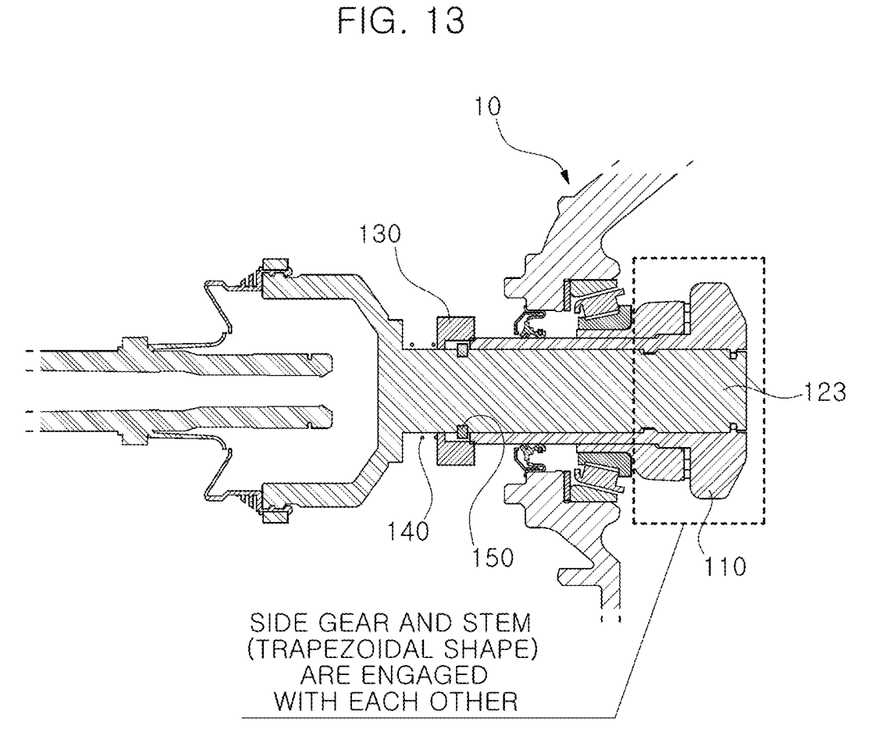

The joint part 123 of the drive shaft 120 of the sub-assembly is inserted into the differential side gear 110 as illustrated in FIG. 12 so that the corresponding cross-sectional trapezoidal stems are engaged with each other as illustrated in FIG. 13.

Figure 14:
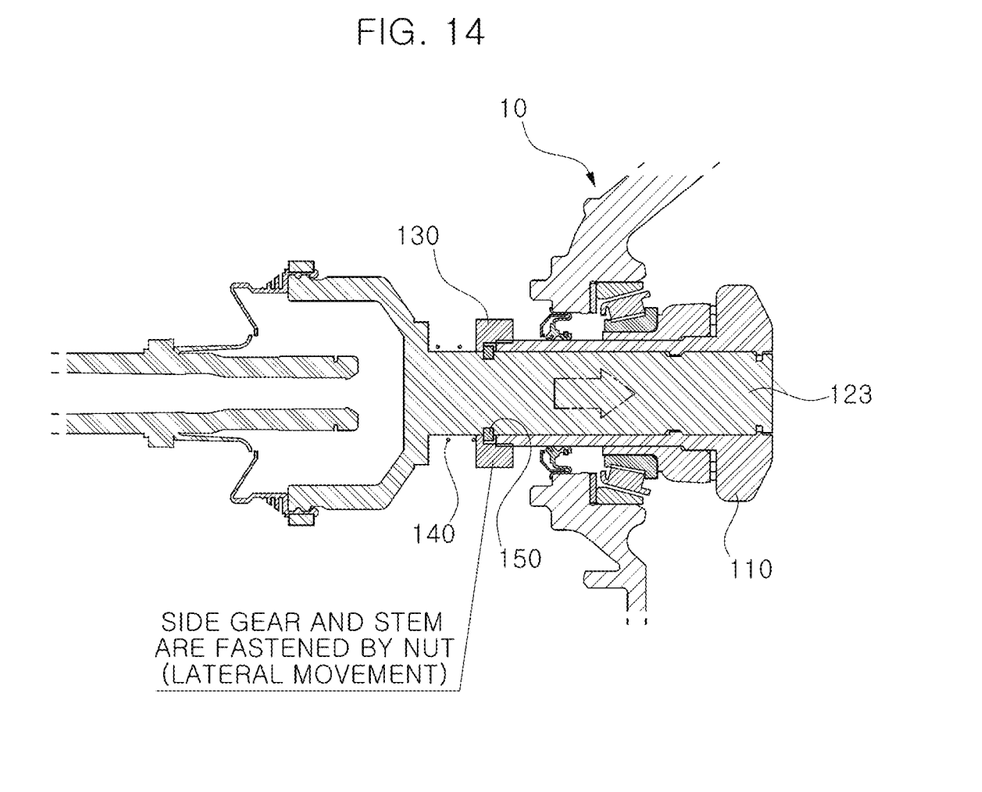

Then, the nut 130 is screwed and fastened to the threaded tab formed on the outer circumferential surface of the end of the differential side gear 110, as illustrated in FIG. 14.

Figure 15:
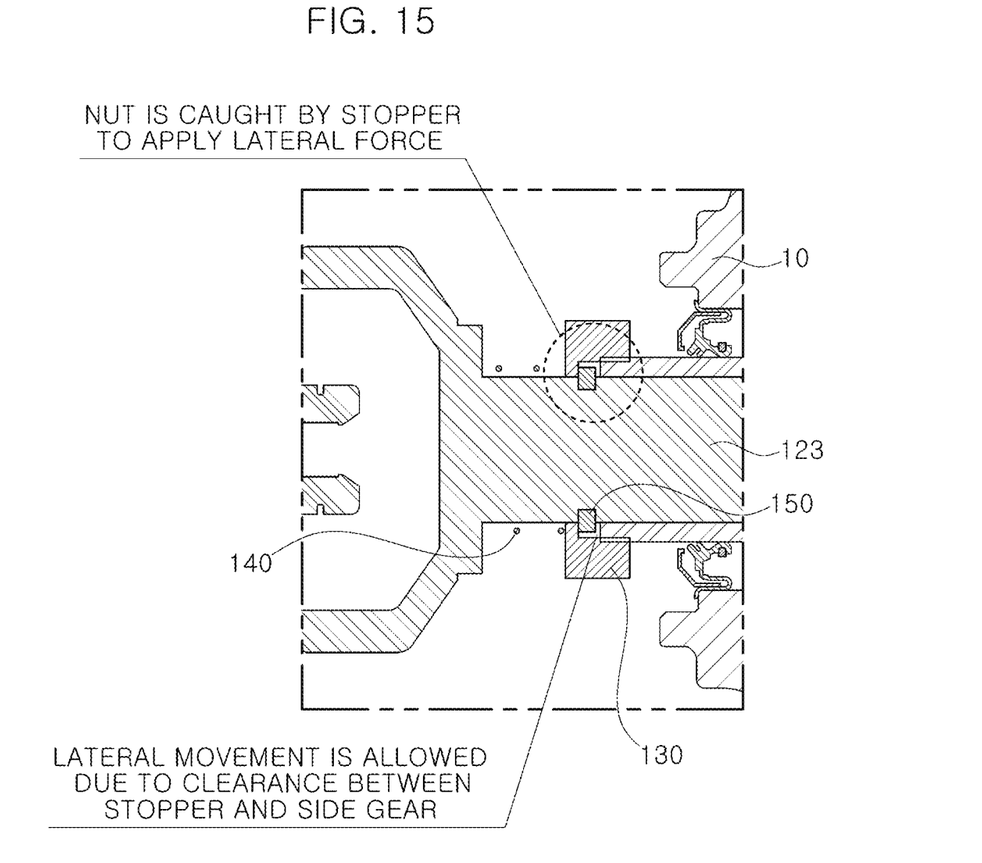
FIG. 15 is a diagram illustrating a portion of the assembly structure of the power transmission assembly according to an embodiment of the present disclosure.

As illustrated in FIG. 15, the nut 130 is abutted against the stopper 150 to apply a lateral force, and in the engaged state, the stopper 150 and the differential side gear 110 remain spaced apart to allow lateral movement by the clearance.

While the foregoing disclosure has been described with reference to the illustrative drawings, it will be apparent to those of ordinary skill in the art that it is not limited to the embodiments described, and that various modifications and variations may be made without departing from the spirit and scope of the present disclosure. Accordingly, such modifications or variations should be considered as falling within the scope of the claims of the present disclosure, and the claims of the present disclosure should be construed based on the appended claims.

What is claimed is:

1. A vehicle power transmission assembly comprising:
   a differential side gear configured to transmit power from an engine to wheels on both sides;
   a drive shaft coupled to the differential side gear configured to transmit, to the wheels, driving force transmitted by the differential side gear;
   a nut engaged with the differential side gear which is coupled to the drive shaft; and
   a spring coupled between the nut and a body part of the drive shaft configured to resiliently support the nut.

2. The vehicle power transmission assembly of claim 1, wherein a joint part of the drive shaft is engaged through the differential side gear, and the nut engages with a threaded tap formed on an end of the differential side gear.

3. The vehicle power transmission assembly of claim 1, further comprising a stopper inserted into a stopper groove formed on an outer circumferential surface of the drive shaft, wherein the stopper protrudes beyond the outer circumferential surface of the drive shaft.

4. The vehicle power transmission assembly of claim 3, wherein the nut includes a locking portion that protrudes radially inward to be caught by the stopper so that the nut is restricted in an engagement position.

5. The vehicle power transmission assembly of claim 3, wherein an end of the differential side gear is caught by the stopper so that the differential side gear is restricted in an engagement position.

6. The vehicle power transmission assembly of claim 1, wherein a pair of stems is provided on an outer surface of a joint part of the drive shaft and an inner surface of the differential side gear, respectively, so that the pair of stems are slidably engaged with each other.

7. The vehicle power transmission assembly of claim 6, wherein the pair of stems each have a trapezoidal cross-sectional shape in which a length direction corresponds to a height direction of the trapezoidal cross-sectional shape.

8. A method of assembling a vehicle power transmission assembly, the method comprising:
   slidably assembling, by an assembly device, a stem formed on an inner surface of a differential side gear transmitting power from an engine to the wheels on both sides, and a stem formed on an outer surface of a drive shaft transmitting, to wheels, driving force transmitted by the differential side gear; and
   fastening, by a fastening device, a nut coupled to an outer circumference of the drive shaft to a threaded tap formed on an end of the differential side gear;
   wherein the nut is resiliently supported by a spring coupled between the nut and a body part of the drive shaft.

9. The method of claim 8, wherein the stems provided on the outer surface of the drive shaft and the inner surface of the differential side gear each have a trapezoidal cross-sectional shape in which a length direction corresponds to a height direction of the trapezoidal cross-section.

10. The method of claim 8, wherein the nut is restricted in an engagement position by a stopper coupled to an outer circumferential surface of the drive shaft.

* * * * *